United States Patent
Saunders et al.

(10) Patent No.: US 10,572,274 B2
(45) Date of Patent: Feb. 25, 2020

(54) CROSS PLATFORM CUSTOM FUNCTIONS

(71) Applicant: Microsoft Technology Licensing, LLC, Redmond, WA (US)

(72) Inventors: Michael J Saunders, Bellevue, WA (US); Hoe Jin Kim, Redmond, WA (US); Zlatko Michailov, Redmond, WA (US); Hardik V. Shah, Seattle, WA (US); Shaofeng Zhu, Bellevue, WA (US); John Zhongqi Wang, Austin, TX (US); Chae Seong Lim, Issaquah, WA (US); Hailei Zhang, Redmond, WA (US); Sudheer Maremanda, Redmond, WA (US); Abhimanyu Sharma, Redmond, WA (US); Jay R. Rathi, Redmond, WA (US); Robert Ion Gavrila, Redmond, WA (US); Ehab Sobhy, Redmond, WA (US); Thomas A. Morrison, Redmond, WA (US); Jai Srinivasan, Bellevue, WA (US); Rolando Jimenez Salgado, Redmond, WA (US); Nicholas Weinandt, Redmond, WA (US); Alexandru Croicu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/889,918

(22) Filed: Feb. 6, 2018

(65) Prior Publication Data
US 2019/0095226 A1    Mar. 28, 2019

Related U.S. Application Data

(60) Provisional application No. 62/562,142, filed on Sep. 22, 2017.

(51) Int. Cl.
G06F 9/445 (2018.01)
G06F 8/61 (2018.01)
G06F 8/76 (2018.01)

(52) U.S. Cl.
CPC ........... G06F 9/44526 (2013.01); G06F 8/61 (2013.01); G06F 8/76 (2013.01); *G06F 9/44521* (2013.01)

(58) Field of Classification Search
CPC .................. G06F 9/44521; G06F 9/44526
(Continued)

(56) References Cited

U.S. PATENT DOCUMENTS 5,437,006 A * 7/1995 Turski ............... G06F 9/44521
715/209
5,706,456 A * 1/1998 Dupper .................. G06F 9/451
715/839

(Continued)

FOREIGN PATENT DOCUMENTS

CN    104503955 A    4/2015
CN    106257887 A    12/2016
EP    2871573 A1    5/2015

OTHER PUBLICATIONS

Mark Kaelin; "Track Stocks Like a Pro with a Free Excel Add-in"; Tech Republic.com website [full url in ref.]; Jun. 17, 2016 (Year: 2016).*

(Continued)

*Primary Examiner* — Qing Chen
*Assistant Examiner* — Clint Thatcher
(74) *Attorney, Agent, or Firm* — Schwegman Lundberg & Woessner, P.A.

(57) ABSTRACT

Systems, methods, and computer-executable instructions for supporting custom functions within an application. An application add-in is received that includes a custom function and
(Continued)

a custom function location. The application is available across multiple platforms. The custom function is also available across multiple platforms. The custom function is registered within the application using the custom function location. A request to invoke the custom function is received within the application A custom function implementation is downloaded from the custom function location. The custom function implementation is executed. A return value is received from the custom function implementation. The return value may be displayed within the application.

20 Claims, 8 Drawing Sheets

(58) Field of Classification Search
USPC ......................................................... 717/178
See application file for complete search history.

(56) References Cited

U.S. PATENT DOCUMENTS

| | | | |
|---|---|---|---|
| 6,167,404 A | 12/2000 | Morcos et al. | |
| 6,201,539 B1* | 3/2001 | Miller | G06F 3/0481 |
| | | | 715/764 |
| 6,519,571 B1* | 2/2003 | Guheen | G06Q 30/02 |
| | | | 705/14.66 |
| 8,108,466 B2 | 1/2012 | Rae et al. | |
| 8,584,004 B2 | 11/2013 | Rae et al. | |
| 9,092,412 B2 | 7/2015 | Salch et al. | |
| 9,529,628 B2 | 12/2016 | Vu et al. | |
| 9,667,689 B2 | 5/2017 | Thomas | |
| 2007/0277109 A1* | 11/2007 | Chen | G06F 8/20 |
| | | | 715/733 |
| 2010/0162232 A1 | 6/2010 | Bhatia et al. | |
| 2012/0036245 A1* | 2/2012 | Dare | G06F 8/60 |
| | | | 709/223 |
| 2012/0047425 A1* | 2/2012 | Ahmed | G06F 17/30905 |
| | | | 715/234 |
| 2013/0198323 A1 | 8/2013 | Prish et al. | |
| 2014/0136937 A1 | 5/2014 | Patel et al. | |
| 2016/0001187 A1* | 1/2016 | Sepulveda | A63F 13/77 |
| | | | 463/31 |
| 2018/0322136 A1* | 11/2018 | Carpentier | G06F 16/168 |

OTHER PUBLICATIONS

"International Search Report and Written Opinion Issued in PCT Application No. PCT/US2018/039195", dated Sep. 21, 2018, 12 Pages.

"Adding an External Library or Custom Function Path", Retrieved From <<https://docs.tibco.com/pub/businessevents-express/5.2.1/doc/html/GUID-2B3F5852-2077-405C-8180-7DC24F1605A3.html<<, Retrieved on: Nov. 13, 2017, 1 Page.

"Custom Function Plug-in", Retrieved From <<https://docs.appian.com/suite/help/17.3/Custom_Function_Plug-ins.html>>, Retrieved on: Nov. 13, 2017, 19 Pages.

* cited by examiner

CROSS PLATFORM CUSTOM FUNCTIONS

PRIORITY CLAIM

This application claims priority to U.S. Provisional Patent Application No. 62/562,142, filed on Sep. 22, 2017, entitled "CROSS PLATFORM CUSTOM FUNCTIONS," the entire content of which is incorporated herein.

BACKGROUND

Some applications allow developers and users to extend the functionality of an application via add-ins that may contain custom functions. Custom functions may be code that is run within the application to provide additional functionality. Today an application may run across different platforms. For example, an application may have a desktop version, a mobile version, and a web based version. Currently add-ins may not easily support all the different platforms of an application, which may limit the usefulness of an add-in.

DETAILED DESCRIPTION

An application ("app"), such as Microsoft® Excel®, may run on different platforms. For example, the application may run on a Windows operation system (OS), a Linux OS, a Mac OS, on a mobile device, on the web, etc. In various examples, the application attempts to provide the same set of functionality across all of the different platforms. Ideally, the same set of functionality may be provided across all platforms. The same set of functionality, however, may not be provided across all platforms due to various technical limitations. For example, in previous applications add-ins and custom functions may have been provided on some, e.g., a desktop platform, but not all platforms, e.g. a web platform.

An application may support custom functions that may be written by end-users or developers that extend the functionality of the original application. For example, a custom function may be provided that retrieves information from a network resource, calculates a value in a way that is not supported in the original application, or calculates a value more efficiently than in the original application.

Described herein are custom functions and add-ins that are available across all platforms where an application runs. The custom functions may then be part of an add-in for the application. The add-in may provide user interaction with the application through buttons and custom user interface (UI) components. The UI components may have the same or similar look and feel of native UI components. The look and feel may be achieved through properties defined in resource files and/or cascading style sheets. In addition, the add-ins may provide access to the native interaction model of the application. In addition, the add-in may be packaged and provided to end users of the application, without requiring the end user to manually define the add-ins and custom functions.

In an example, JavaScript may be used to implement portions of add-ins and custom functions. For example, an application add-in may include a manifest document, such as an eXtensible mark-up language (XML) document, that contains a reference to custom functions that are provided by the add-in. For example, the reference may be in the form of a source location, such as a uniform resource identifier (URI), of a document that contains the custom functions. The manifest may be provided directly to end-users or may be deployed via an organization or as part of a store.

In an example, a custom functions implementation file may be referenced by the manifest document. The implementation file may be available on the web and accessed by different end-users using the web or other network. The custom functions implementation file may contain the registration code for functions and also the code for the custom functions themselves. In addition, Hyper Text Markup Language (HTML) files that correspond with the custom functions may be made available.

Figure 1:
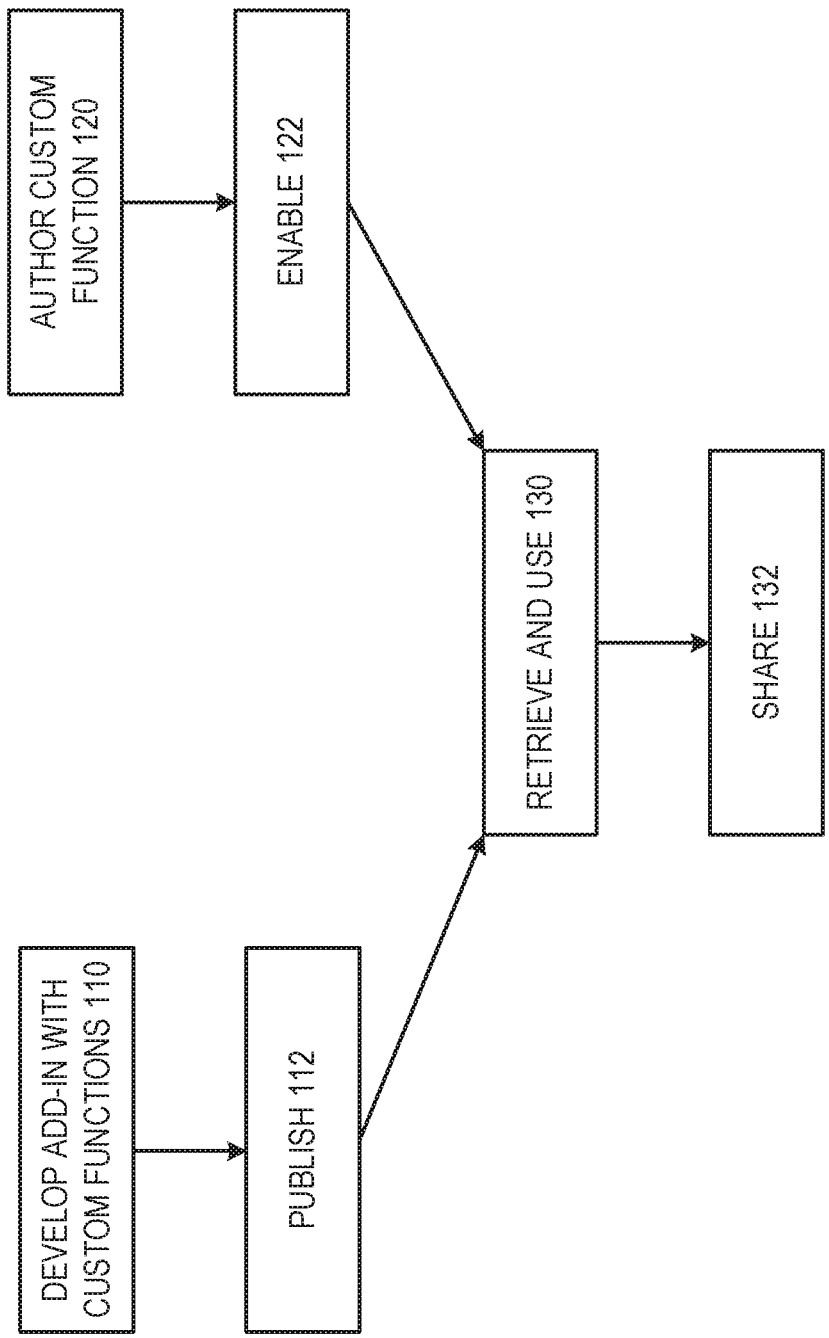
FIG. 1 is a block diagram of a system for providing custom functions to an end user in accordance with respective examples.

FIG. 1 is a block diagram of a system for providing custom functions to an end user in accordance with respective examples. Developers may develop and provide add-ins that contain custom functions 110. Developers may package the add-in and publish 112 its manifest document. This allows end-users to receive and use the developer's add-in 130. As described in greater detail below, an end-user may download the manifest document. The application then uses the manifest document to retrieve and register the custom functions. An end-user may also share 132 add-ins and therefore, the custom functions by sharing the manifest document with others. Developers may also author, create and develop custom functions that are not part of a specific add-in 120. The custom functions may be enabled for a user and or a group of users 122. Once a custom function is registered or an add-in with a custom function is installed, the custom functions are available for use within the application. For example, an end-user may access a custom function in a spreadsheet application in the same way built in functions are access, e.g., =customFunctionName( ).

Figure 2:
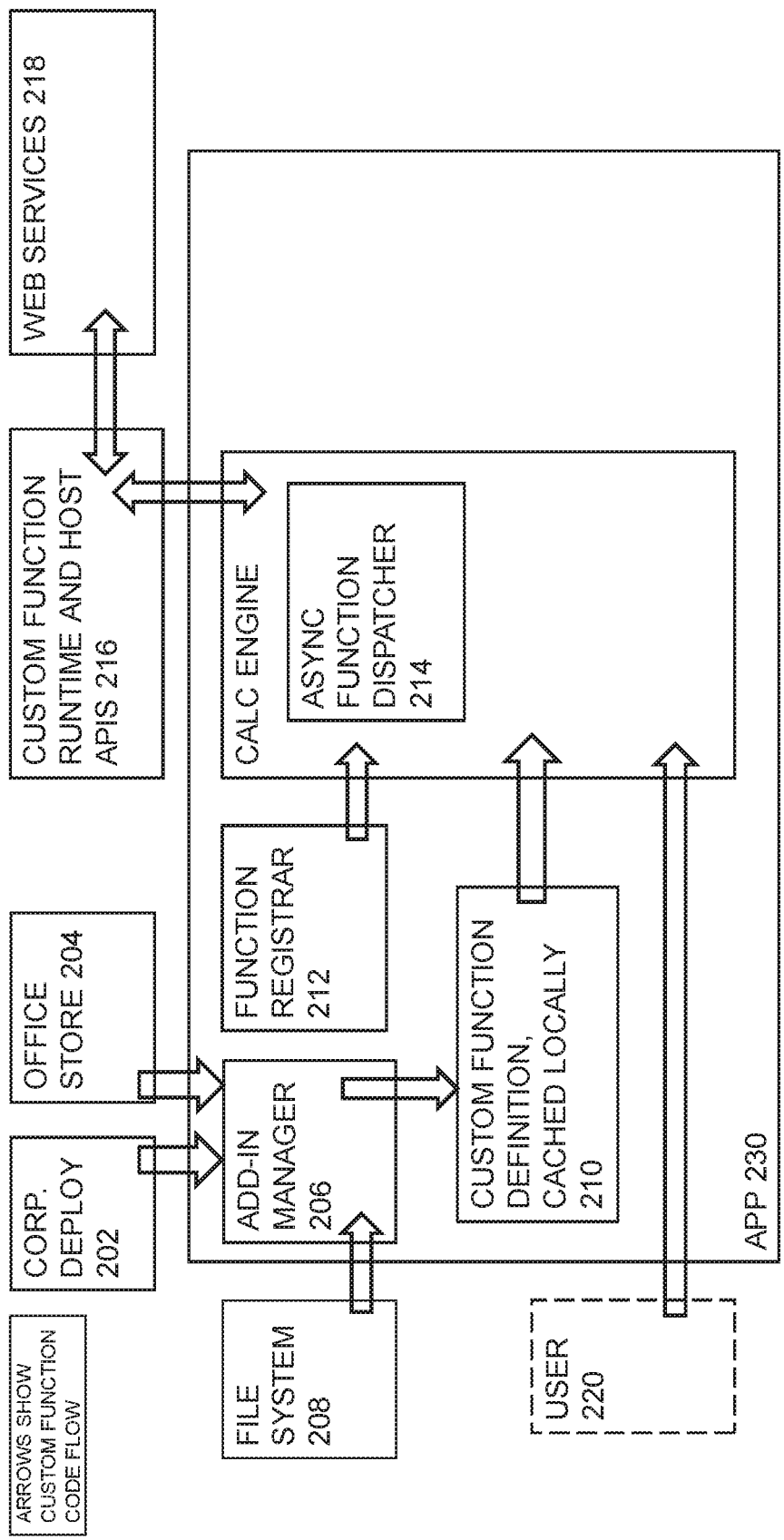
FIG. 2 is a component diagram of a system for providing custom functions to an end user in accordance with respective examples.

FIG. 2 is a component diagram of a system for providing custom functions to an end user 220 in accordance with respective examples. The arrows illustrate the custom function code and data flow through the system. The custom function may be installed and run within an application 230. An add-in with custom functions may be downloaded or retrieved from a corporate deploy 202 or from an application store, such as an office store 204. The add-in may be downloaded as the manifest document as described above. The add-in may be downloaded into the application 230. The application 230 may include an add-in manager 206 that manages all of the add-ins within the application 230. The add-in manager 206 may review the manifest document and determine there are one or more custom functions within the add-in.

In an example, the add-in manager 206 may retrieve the custom function definition, e.g., the metadata describing the custom function, via a source indicator from the manifest document. The custom function definition may then be cached 210. The caching of custom functions is described in greater detail below. The application 230 may include a function register 212 that provides functionality that registers custom functions. In one example, the function register 212 may be implemented in JavaScript. In an example, the custom function definition may be provided in the custom function source code that also provides the custom function. A registration function within an application may request the definition from the custom function as part of the registration process. For example, the custom function may be implemented in JavaScript. Custom functions may have metadata that describes the custom function, e.g., the custom function definition. The metadata may include the function's name, parameters, return value, description, help uniform resource location (URL), etc. In an example, the metadata for custom functions is added to an array or collection within the application 230. This array may be used to provide a list of custom functions that may be used in a drop-down list. In addition, the array may be used by the application to invoke the custom function.

The metadata of a custom function may also include a call function that is invoked when the custom function is called. In addition, the metadata may indicate if the custom function uses network resources, provides its priority for order of operations, if the custom function supports batching, and if the custom function supports streaming. When the application 230 opens or when a document within the application 230 opens, the available custom functions may be loaded. As described in greater detail below, the custom functions may be loaded from a local cache that is located on a local file system 208. The custom function metadata may be stored as an object and the application 230 may maintain an array of available custom functions.

Once the custom function's metadata is loaded, the user 220 may call the custom function within the application 230. For example, a custom function may be invoked the same way built-in functions of the application 230 may be called, e.g., =customFunction( ). The custom function may then be invoked by the calculation engine. When the application 230 executes the custom function, the application 230 may use an asynchronous function dispatcher 214. The asynchronous function dispatcher 214 may retrieve the custom function and execute the custom function within a custom function runtime 216. In an example, the custom function runtime 16 is a JavaScript runtime. In other examples, the custom function runtime 216 may be implemented in Python, C #, etc. The custom function runtime 216 may then access various web servers 218. For example, the custom function may access a resource available on the web or other network. As an example, the custom function may access a stock price quote available on the web. The stock price quote may then be returned by the custom function and inserted into a document within the application 230.

Figure 3:
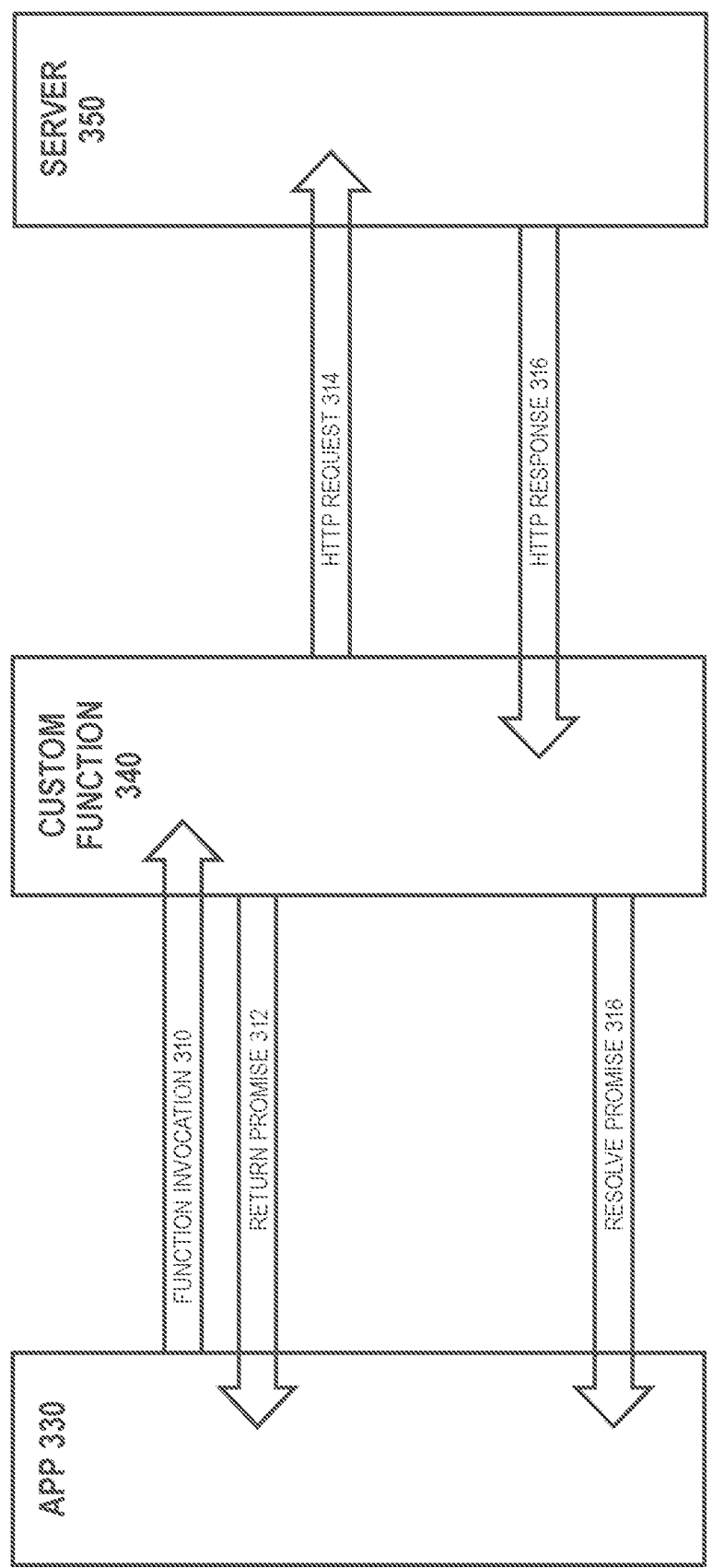
FIG. 3 is flow diagram of a custom function that access a network resource in accordance with respective examples.

FIG. 3 is flow diagram of a custom function that access a network resource in accordance with respective examples. As noted above, a custom 340 function may access various online resources. An application 330 may invoke 310 the custom function 340. The custom function 340 may return a promise 312 back to the application 330. The promise may then later be resolved with the results of the custom function or an error indication. The custom function 340 may invoke an hypertext transfer protocol (HTTP) request 314. The HTTP request 314 may be to a server 350. For example, the server 350 may be a server run by the developer of the custom function 340. The server 350 responds 316 with data. The custom function 340 receives the response and may analyze or parse the returned data from the server 350. The custom function 340 may then resolve the promise 318 to indicate that the HTTP response and the running of the custom function 340 was a success. In addition, the custom function 340 may return data based on the response. For example, the custom function 340 may parse the response for a stock price quote. The stock price quote may then be returned as part of resolving the promise 318.

In an example, a custom function may be used numerous times within a single document. For example, a custom function may be copied into tens, hundreds, thousands, etc., cells within a spreadsheet. In an example, each instance of a custom function is executed separately. In another example, instances of the same custom function may be batched together to improve performance.

Figure 4:
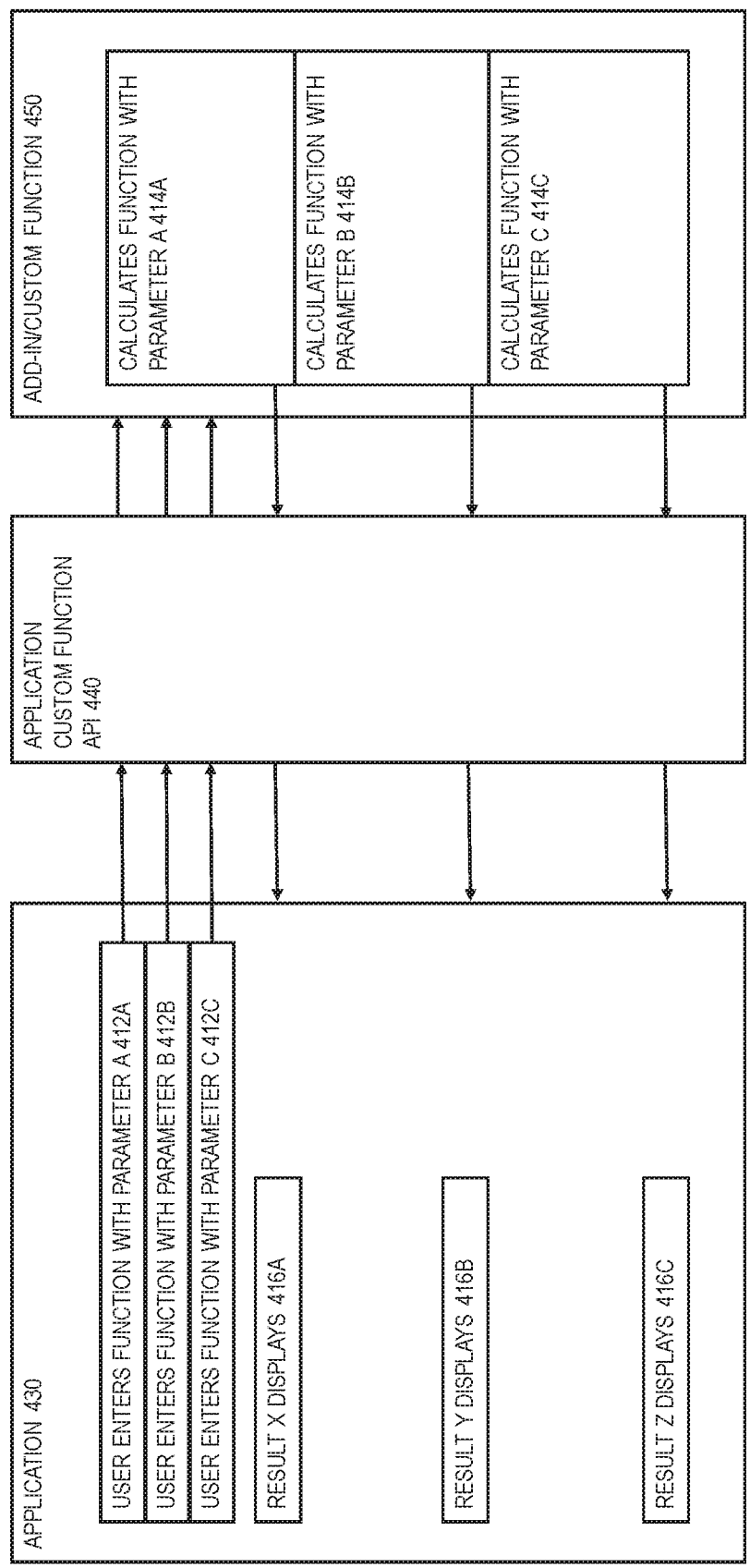
FIG. 4 is flow diagram of a custom function that does not utilize batching in accordance with respective examples.

FIG. 4 is flow diagram of a custom function that does not utilize batching in accordance with respective examples. An application 430 may have a custom function 450 installed and available to be invoked by a user. The custom function 450 may be called multiple times 412A, 412B, and 412C. For example, the custom function 450 may be copied to multiple cells within a spreadsheet. The custom function 450 may not support batching. When not batched, each custom function call 412A, 412B, and 412C is separately called via a custom function API 440. The custom function API 440 then calls the custom function for each call. In this example, the custom function API 440 may pass each custom function call onto to the appropriate custom function. The custom function then runs on each parameter 414A, 414B, and 414C. Each custom function invocation returns a result 416A, 416B, and 416C that may then be displayed by the application 430. If there is a number of calls to the same custom function, e.g., tens, hundreds, etc., the calls may be batched to increase efficiency.

Developers of custom functions may support batched calls, where a single call to the custom function operates over multiple parameter sets. Batching multiple custom function calls may result in better efficiency. In addition, batching may be supported such that the end user does not need to invoke the custom function in any particular way to use batching. In other words, the user may invoke a custom function without knowing that batching of the custom function will take place.

Figure 5:
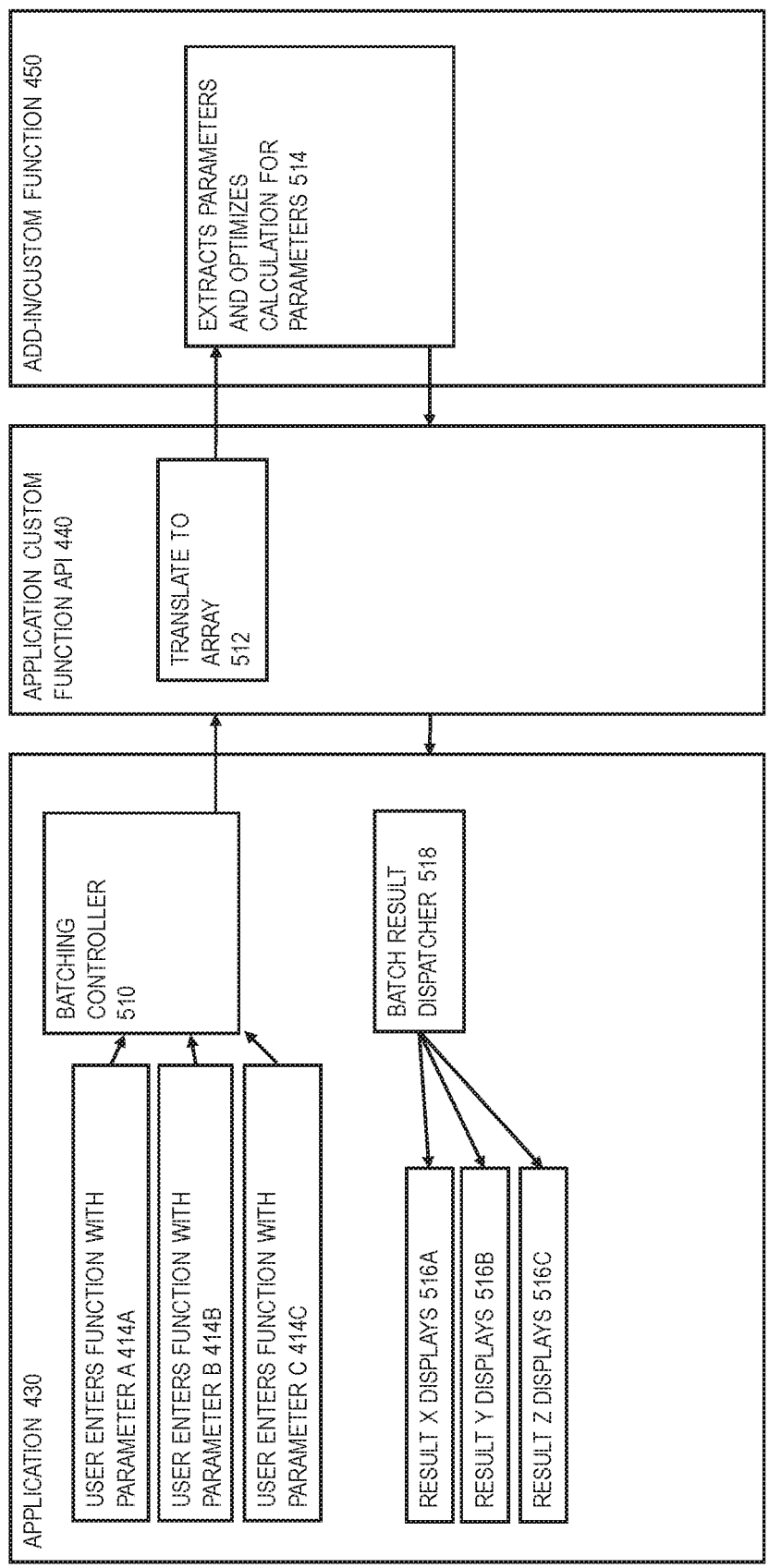
FIG. 5 is flow diagram of a custom function that utilizes batching in accordance with respective examples.

FIG. 5 is flow diagram of a custom function that utilizes batching in accordance with respective examples. The application 430 may invoke the custom function 430 the same way as described in FIG. 4. For example, the custom function 430 may be invoked multiple times 412A, 412B, and 412C. A batching controller 510 may be used to batch the multiple custom function calls. The batching controller 510 may use a timer to determine when to batch custom functions. When the timer expires, the batching controller 510 may review the document for the custom functions that need to be called. In another example, a recalculation dependency tree may be traversed to determine which leaf nodes need to be calculated. This traversal may determine the custom functions that still need to be calculated. The invocations 412A, 412B, and 412C of the custom function may be the exact same regardless as to if the custom function supports batching. A user of the application 430, therefore, does not need to know if a custom function supports batching or not nor does the user have to provide any indication to use batching.

The batching controller 510 may determine that the three custom function invocations 412A, 412B, and 412C may be batched and that the custom function supports batching. The batching controller 510 may determine that the custom function supports batching based upon the registration metadata provided by the custom function registration. The batching controller 510 may provide the parameters of the three batched custom functions and an indication of the custom function to the custom function API 440. The custom function API 440 may translate the parameters into an array or a collection 512. The custom function 450 may then be invoked one time with the parameter array rather than three separate calls. The custom function 450 extracts the parameters and then calculates three corresponding result values 514. The result values may be provided to a batch result dispatcher 518 via the custom function API 440 as an array of result values. The batch result dispatcher 518 extracts the results from the array and provides the results to the appropriate custom function call. The results in the array are in a corresponding order compared to how the parameters were passed into the custom function. That is, the first result corresponds with the first parameter set. The results of the custom function may then be displayed 516A, 516B, and 516C. In an example, the custom function may return an array of promises, which may be resolved at any time.

Custom functions may return data that changes over time. For example, a custom function may return a current stock price, a current temperature, factory output value, etc. In an example, an application may call a function, either built-in or custom, one time. In this example, updated data is not available to the application. To resolve this issue custom functions may support streaming of updated data to the application. Streamed custom functions output data to portions of a document, such as cells, repeatedly over time, without waiting for the application or users to request recalculations.

Figure 6:
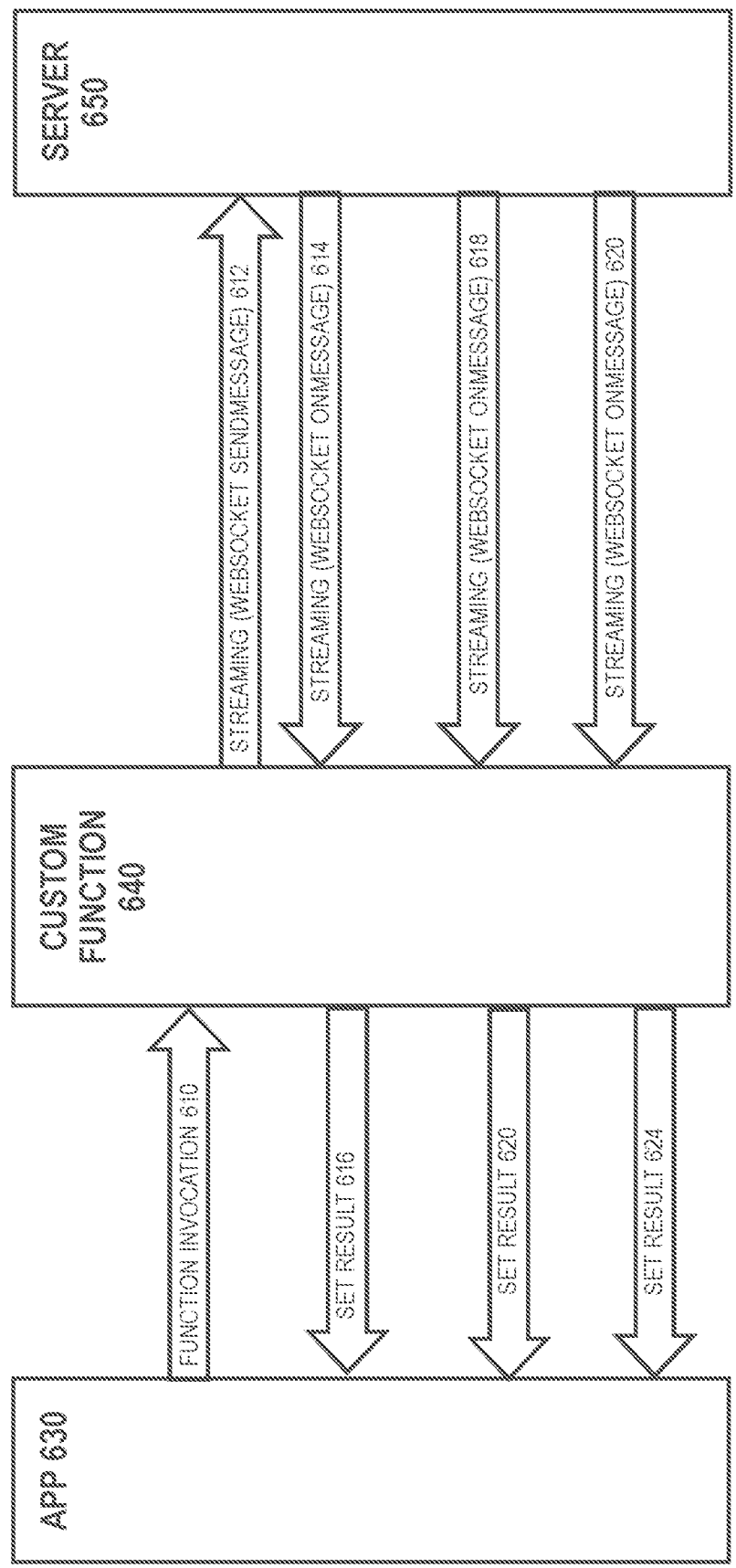
FIG. 6 is flow diagram of a custom function that uses streaming accordance with respective examples.

FIG. 6 is flow diagram of a custom function 640 that uses streaming accordance with respective examples. An application 640 may provide access to the custom function 640, such that the custom function 640 may be invoked 610 by a user of the application 630. The custom function 640 accesses 612 a sever 650 and retrieves data 614. The data is passed back to the application 630. The application 630 may then set the result 616. This is the same data flow as a standard custom function.

The custom function 640, however, will updates its data periodically. For example, the custom function 640 may retrieve a temperature from a thermometer by accessing the server 650. After the first result is passed back to the application 630, the custom function may set a timeout to call its updating function. In the example below, the setTimeout method calls the getNextTemperature method after an interval of time has passed. Upon passing of the interval, the custom function 640 accesses the server 650 again to retrieve updated data which is passed back to the application 630. The application 630 may then update the result 620. A third update from the server 622 may occur after another interval of time has passed. The application 630 may then update the custom function's value again 624. This process may repeat until stopped by the application 630 or the custom function 640.

An example custom function that uses streaming is shown below.

```
function streamTemperature(thermometerID, interval, setResult){
    function getNextTemperature( ){
        getTempFromServer(thermometerID, function(data){
            setResult(data.temperature);
        });
        setTimeout(getNextTemperature, interval);
    }
    getNextTemperature( );
}
```

In another example, a connection from the custom function 640 to the server 650 is opened. The server 650 may stream data back to the custom function 640. When the custom function 640 awakes after a timer expiration or handles a data available interrupt, the custom function 640 may provide the streamed data back to the application 630.

In another example, the application 630 invokes the custom function 640 after expiration of a timer rather than the custom function 640. In this example, a state identifier may be provided to the custom function 640. In addition, the custom function 640 may return a state identifier that is passed back to the custom function 640 on the next invocation.

In another example, as shown in the following code, the custom function incrementValue adds a number to the result every second, and the application may display each the new value automatically.

```
function incrementValue(increment, setResult){
    var result = 0;
    setInterval(function( ){
        result += increment;
        setResult(result);
    }, 1000);
}
```

In the above example, the final parameter, setResult, is not specified during registration. In addition, this parameter may not be shown to users when they enter the function. Rather, the setResult function is a callback function that is used to update the value. In the example, the setResult function is called every 1000 milliseconds based upon the 1000 parameter. In order for the application to pass the setResult function, the custom function indicates the custom function supports streaming during the function's registration by setting the parameter stream to true.

In an example, custom functions are available to the user of an application in the same manner as built in functions. For example, custom function names may be autocompleted in the same way a built-in function is autocompleted. A user may start typing the name of a custom function and the full custom function name, parameters, descriptions, etc. may appear for the user to select the custom function and/or receive further information about the custom function. An autocomplete feature, therefore, may be available for all custom functions. Some level of caching may be used to avoid having to load/run all possible custom functions for a document within the application. This allows custom functions to be available for features such as autocomplete, but dynamically only load the custom functions that are used by a document.

Figure 7:
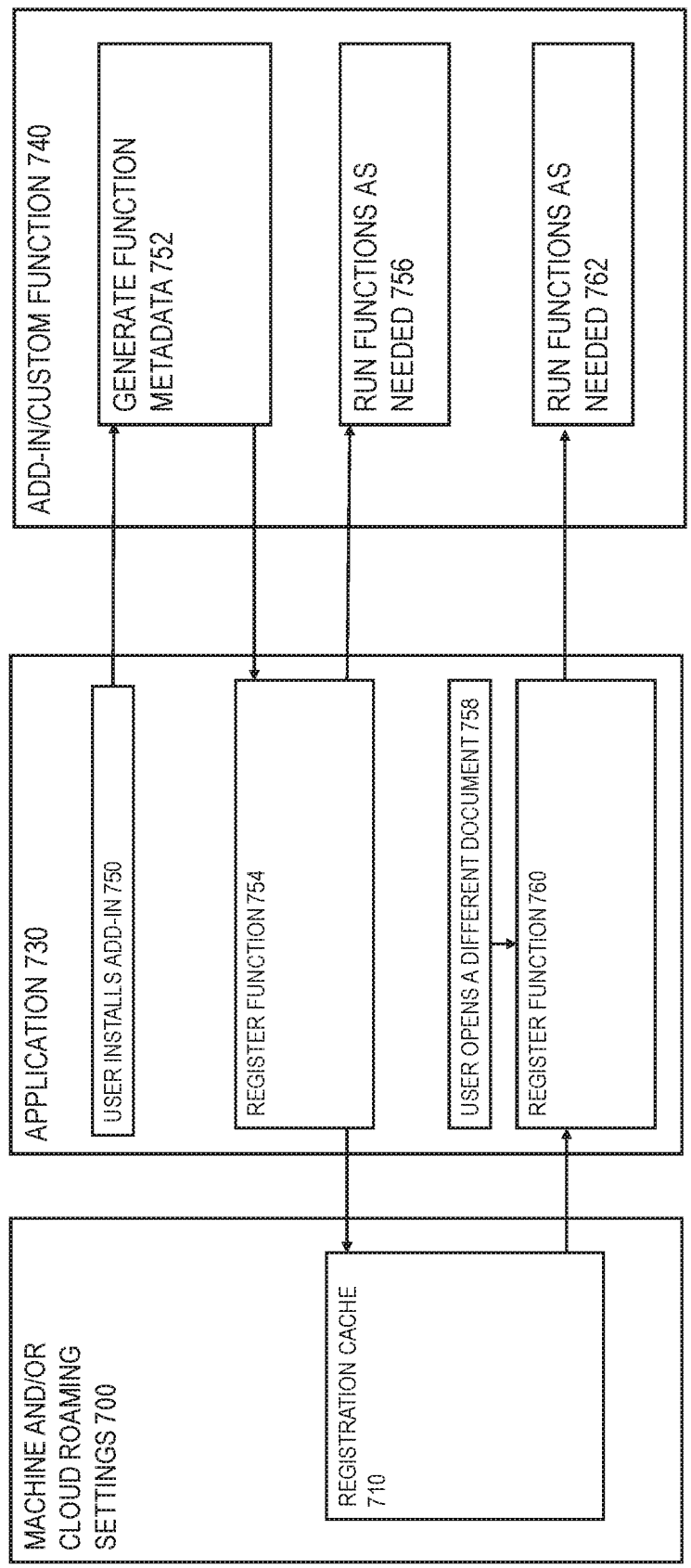
FIG. 7 is a component diagram of a system for registering and caching custom functions in accordance with respective examples.

FIG. 7 is a component diagram of a system for registering and caching custom functions in accordance with respective examples. A user may install within an application 730 an add-in 750 that may contain a custom function 740. The custom function 740 may generate metadata 752 that is provided to a register function 754 of the application 730. The register function 754 may store the custom function metadata. The metadata may include the custom function's name, description, and parameters and descriptions. The metadata may also include optional parameters and descriptions, a help URL, a developer information URL, etc. A registration cache 710 may be used to cache the custom function's metadata. The registration cache 710 may be stored separate from the application, the application documents, and separate from the add-in. The registration cache 710 may be stored on a local machine or in roaming settings that are available over a network 700. Storing the cache in roaming settings allows the cache to be available to a user across multiple devices. The roaming settings is accessible over a network to multiple devices. A user, therefore, may register a custom function on one device and have the custom function available on other devices. Once registered, the custom function 740 may be ran 756 within a document of the application 730.

The user or another user may open a second document 758 using the application 730. In an example without caching, the second document would request the metadata from the custom function 740. Using caching, however, the metadata may be retrieved from the registration cache 710. The custom function 740 may be registered for use within the second document 760 using the metadata retrieved from the registration cache 710. Once registered in the second document, the custom function 740 may be ran 762 within the second document.

Caching allows the application 730 to provide information about all possible custom functions available within a document without having to invoke any custom application or without requiring retrieving the metadata for each custom function. The application 730, therefore, may provide features such as autocomplete, parameter lists, help links, etc., quickly and efficiently without having to access network resources associated with the custom functions, such as the developer's websites.

In an example for a spreadsheet application, an add-in may contain custom javascript functions that contain the following components:
Manifest.xml—this file is used the same as for regular add-ins, and contains a reference to the custom functions (described in the Manifest section).
Functions.html—this file may be hosted on the web by the developer. When the file loads as part of the CustomFunctions action, the page is hidden. When this file loads, the file remains open until the workbook closes. The specific times when SourceLocation.html loads as part of the CustomFunctions action is defined in the Persistence and Activation sections below. Functions.html will reference JavaScript to register and execute the functions, such as Functions.js.
Functions.js—this file is authored by the developer, e.g., a third-party, and may be hosted on the web. This file may include registration code for functions and the function code itself. Samples of functions.js are describe below. Functions.js is referenced directly in the manifest for javascript-only execution, and may also referenced in Functions.html.
Spreadsheetfunctions.js—this is authored by the application developer, e.g., Microsoft. This file may contain the library that lets custom javascript functions run correctly within the application. It may be packaged with Functions.js.

An example of a section of a manifest document is shown below. For JavaScript functions, the section may contain a SourceLocation element specifying ajavascript file. Below is a sample manifest excerpt which is added in the

```
<VersionOverrides>/<Hosts>/ section of the manifest:
    <AllFormFactors>
        <ExtensionPoint xsi:type="CustomFunctions">
            <Script>
                <SourceLocation resid="residUDFjs" />
            </Script>
            <Page>
                <SourceLocation resid="residUDFhtml" />
            </Page>
        </ExtensionPoint>
    </AllFormFactors>
```

The Script element has a SourceLocation, which may be used for JS-runtime-execution. The Page element also has a SourceLocation, which may be used across platforms.

JavaScript Registration

In an example, custom functions are implemented in JavaScript. In this example, the add-in registers functions through JavaScript. See implementation samples in the Samples sections below.

First, functions and their metadata are defined in the JavaScript runtime. Function metadata may be added to a CustomFunctions object as one CustomFunction object per function as shown in the table below:

TABLE 1

| Object in JS Runtime | Type | Description |
| --- | --- | --- |
| customFunctions | Object | A map of function names to CustomFunction objects |

A new Rich API Object is supported with functionality described below, e.g., workbook.CustomFunctions, which is a CustomFunctionCollection object. The Rich API method that the developer may call is registerAll( ) to register custom functions. The Rich API Object is described below in the Tables 2-7.

CustomFunctionCollection Properties

TABLE 2

| Property | Type | Description |
| --- | --- | --- |
| Items | CustomFunction[ ] | A collection of CustomFunction objects. Read-only. |

CustomFunctionCollection Methods

TABLE 3

| Method | Return Type | Description |
| --- | --- | --- |
| register( ) | void | Calls add( ) on each function. The developer is expected to call this function at the beginning of each session. |
| add(function: CustomFunction) | void | Registers a new custom function. Return type is not defined |
| getItem(name: string) | CustomFunction | Gets a custom function using its id. |

CustomFunction Properties

TABLE 4

| Property | Type | Description |
|---|---|---|
| call | Function | Callback for the function to be executed. |
| description | String | Description of the function for autocomplete text |
| helpUrl | String | URL of a help page for the function to be displayed in a task pane |
| parameters | CustomFunctionParameter[ ] | Parameter metadata for the custom function |
| options | Object | Custom functions options to configure function behaviour |

CustomFunction Options

TABLE 5

| Name | Type | Description |
|---|---|---|
| batch | boolean | The function supports an array of parameter arrays as input, for batched calls. Default is False. |
| stream | boolean | The function requires a callback as the final argument, to write values repeatedly to the topic (like "RTD", often used for web data such as stocks). Default is False. |
| volatile | boolean | Defines whether the function recalculates every time data in the workbook changes. Default is False. |
| priority | Integer | Defines the order in which JavaScript functions for an add-in should be called, in case multiple functions from the same add-in become ready for recalc in the same cycle. Lower values calculate first. Default is False. |
| requiresWeb | boolean | Defines whether the function needs internet access. Default is False. |

CustomFunctionParameter Properties

TABLE 6

| Name | Type | Description |
|---|---|---|
| name | String | Name of the parameter |
| description | String | Description of the parameter. Optional. |
| optional | Boolean | Specifies whether the parameter is required. Default is False |

CustomFunction Methods

TABLE 7

| Method | Return Type | Description |
|---|---|---|
| delete( ) | void | Unregisters the function |

JavaScript Function Behavior Types

The functions may be actual JavaScript functions defined by the add-in in functions.js. The spreadsheet application may trigger these functions directly whenever the application calculation requires a new value. The functions may return a value or a JavaScript Promise object, which the add-in will later resolve to a value. In an example, there are three types of invocation and updating behavior, depending on the Behavior property defined for the function. These behaviors are described in table below:

TABLE 8

| Behavior | Parameters | Return Type | Invocation time |
|---|---|---|---|
| Normal | Single set of parameters. Examples: stock("bid", "IBM") | Value or Promise. The value can be any type. | When calc requests a value |
| Batched | Array of parameter sets. Examples: stock([["bid", "IBM"]]) stock([ ["bid","IBM"], ["ask","IBM"] ]) | Array of Values or Promises. The result indexes match the argument indexes. | When calc requests a value |
| Streamed | Single set of parameters. Examples: stock("bid", "IBM") | Value or Promise. The value can be any type. | When calc requests a value, which is guaranteed to keep happening automatically after each successful write |

Below are sample implementations in javascript that calculates a Fibonacci number. Here are the sample contents of functions.js:

TABLE 9

```
1.  function fibonacci(n) {// calculates the nth Fibonacci number where
F1 == F2 == 1
2.      var curr = 1,   last = 0;
3.      for (i = 1; i < n; i++) {
4.      curr += last;
5.           last = curr– last;
6.      }
7.      return curr;
8.  }
9.
10.  // register the function
11.  App.customFunctions["MATHPACK.FIBONACCI"] = {
12.      onInvoke: fibonacci,
13.      description: "calculates the nth Fibonacci number",
14.      helpUrl: "https://www.mathpack.com/fibonacci/help.html",
15.      parameters: [{name: "n", description: "index of the number to
calculate"}]
16.  }
17.  App.run(function(ctx) {
18.      ctx.workbook.customfunctions.register( );
19.  });
```

Below is an example function that supports batching.

TABLE 10

```
1.  function fibonacci(argArrays) {
2.  //calculates Fibonacci numbers of the input indexes (eg. [[4][9][1]])
3.      var r = argArrays.map(function(arr, i){ return [arr[0],i]; }
).sort(function(a,b){
4.      return a[0]-b[0];
5.      });
6.      // r contains a sorted array of the inputs, with their ordering (eg.
[[1,3],[4,0],[9,1]])
7.      var curr = 1,
8.      last = 0,
9.      inputIndex = 0,
10.     results = [ ];
11.     for (var i = 1; results.length < r.length; i++) {
12.     // check all inputs for a match
13.     if(i == r[i][0]){
14.         results.push([curr,r[inputIndex][1]]);
15.         inputIndex++;
16.         i--;
17.     }
```

TABLE 10-continued

```
18.          else {
19.              curr += last;
20.              last = curr – last;
21.          }
22.      }
23.      // sort all results by their original ordering
24.      return results.sort(function(a,b){
25.          return a[1]-b[1];
26.      }).map(function(arr){ return arr[0]; });
27. }
28.
29. // register the function
30. App.customFunctions["MATHPACK.FIBONACCI"] = {
31.      onInvoke: fibonacci,
32.      description: "calculates the nth Fibonacci number",
33.      helpUrl: "https://www.mathpack.com/fibonacci/help.html",
34.      parameters: [{name: "n", description: "index of the number to calculate"}],
35.      options: {batch: true}
36. }
37. App.run(function(ctx) {
38.      ctx.workbook.customfunctions.register( );
39. });
```

Below is an example javascript Function that retrieves web data asynchronously.

TABLE 11

```
1.  function getStockPrice(ticker) {// returns a stock price asynchronously
2.      var result = new Promise (function (resolve, reject) {
3.          getPriceAsyncFromWeb (ticker, function(data) {
4.              resolve(data.lastPrice);
5.          }
6.      }
7.      return result;
8.  }
9.
10.
40. // register the function
41. App.customFunctions["FINANCE.GETSTOCKPRICE"] = {
42.      onInvoke: getStockPrice,
43.      description: "returns the price of a stock",
44.      helpUrl: "https://www.finance.com/function/help.html",
45.      parameters: [{name: "ticker", description: "symbol for the company to query"}],
46. }
47. App.run(function(ctx) {
48.      ctx.workbook.customfunctions.register( );
49. });
```

Below is an example of a streaming javascript function.

TABLE 12

```
1.  function getStockPrice(ticker) { // returns a stock price continuously
2.      if (!stocks) initializeStocks( );
3.      if (!stocks[ticker]) stocksWebSocket.send({"add": [ticker]});
4.      return new Promise (function (resolve, reject) { stocks[ticker] = resolve;
});
5.      // saves the callback in the map for the next time a values comes from the server
6.  }
7.
8.  var stocksWebSocket, stocks;
9.
10. function initializeStocks( ) {
11.      stocksWebSocket = new WebSocket("https://www.stocksservice.com/realtime");
12.      stocksWebSocket.onmessage = function(evt) { writeNewValues(event.data) };
13.      stocks = { }; // map of stocks to callbacks
14. }
15.
16. function writeNewValues(values) { // values is a map of stocks to prices
17.      var removedStocks = [ ];
18.      values.keys( ).forEach(function(ticker) {
19.          if (typeof stocks[ticker] === "function"){
20.              stocks[ticker](values[ticker]);
21.          }
22.          else removedStocks.push(ticker);
23.          // expect a call from Application to get the new price after each result is sent
24.          stocks[ticker] = "no callback";
25.      });
26.      stocksWebSocket.send( {"remove": removedStocks} );
11. }
12.
50. // register the function
51. App.customFunctions["FINANCE.GETSTOCKPRICE"] = {
52.      call: getStockPrice,
53.      description: "returns the price of a stock continuously",
54.      helpUrl: "https://www.finance.com/function/help.html",
55.      parameters: [{name: "ticker", description: "symbol for the company to query"}],
56.      options: {stream: true}
57. }
58. App.run(function(ctx) {
59.      ctx.workbook.customfunctions.addAll( );
60.      return ctx.sync( );
61. });
```

Custom Functions may require a new Action with the application. The table below describes how this Action compares with other common add-in Actions.

TABLE 13

|  | Task Pane launch without Command | ShowTaskPane (with Command) | ExecuteFunction (with Command) | CustomFunctions |
|---|---|---|---|---|
| Web page visible? | Yes | Yes | No | No |
| Page stays open until the workbook closes | Yes | Yes | No | Yes |
| Activates on install/insert? | Yes | No? | No | Yes |
| Activates on doc-open? | Sometimes | Sometimes | No | Sometimes* |
| Activates on formula-entry? | No | No | No | Sometimes* |

When the SourceLocation page is launched as a CustomFunction action instead of as a normal task pane, the query string may include the query string parameter customfunctions=true.

One purpose of a registration cache is to provide auto-complete options to users without running javascript code first. In an example, whenever the add-in registers custom functions (specifically, on each file-save action after registration), each custom function is cached on the machine for that user with the following info:
 Add-in info
 Solution ID
 Catalog ID
 CustomFunctions object (see the object definition above)
 Function name
 Function description
 Function parameters and descriptions
 Optional parameters
 Help URL The actual JavaScript function that executes, however, is not stored. On every application workbook boot/load for that user, the application may check the machine cache for this "disk-registration". If the registration is available, the application may register those functions (with a temporary callback).

The add-in itself may then be launched the first time the custom function is invoked for that workbook. On a web browser, local storage may be used for the machine cache. In other examples, the cache may be persisted across a user's devices through Roaming Settings.

In example, there may be five possible persistence states, with respect to the contents of the document. These states are described in the table below.

TABLE 14

| State Name | Add-in (web extension) part? | Custom streaming function in at least one cell? | Custom single-result function in at least one cell? |
|---|---|---|---|
| No add-in file state | No | No | No |
| Only add-in file state | Yes | No | No |
| Single-result file state | Yes | No | Yes |
| Streaming file state | Yes | Yes | No |
| Streaming file state | Yes | Yes | Yes |

In an example, this table shows when functions.html and the functions runtime is launched, according to different persisted states (top row) and user actions (left column). Whenever the runtime is launched for an add-in, it closes any previous functions runtime for that add-in. The top row shows the initial state and each row shows the result of an action:

TABLE 15

|  | No add-in file state | Only add-in file state | Single-result file state | Streaming file state |
|---|---|---|---|---|
| Install from Store | Launches functions.html after user consent. No state change | | | |
| Insert from My Add-ins | Launches functions.html after user consent. No state change | | | |
| Install from Centralized Deployment | Launches functions.html. No state change | | | |
| Side-load from file share | Launches functions.html. No state change | | | |
| Open in Application | No result. No state change | Trust prompt if unentitled. Launches functions.html. No state change | Trust prompt if unentitled. Launches functions.html and | |

TABLE 15-continued

| | No add-in file state | Only add-in file state | Single-result file state | Streaming file state |
|---|---|---|---|---|
| | | | | calls the streamed functions. No state change. |
| Type in the start of a custom function name | Shows result, if any, from registration. No state change | | | |
| Enter an unregistered function name | #VALUE error | | | |
| Enter a registered function name | | Launches functions.html (if not already running) and triggers the function. Enter Single-result or streaming file state | Triggers the function. Enter Single-result or streaming file state | Triggers the function. |
| Recalculation triggered on registered function | | N/A: function must be in the file | | Triggers the function. |
| Update metadata from Store | n/a | | Launches functions.html after user consent the next time the document is opened. No state change | |
| Remove last function instance | n/a | n/a | Only add-in file state | Only add-in file state |
| Close workbook | No action | | Closes functions.html if it's running | |

Figure 8:
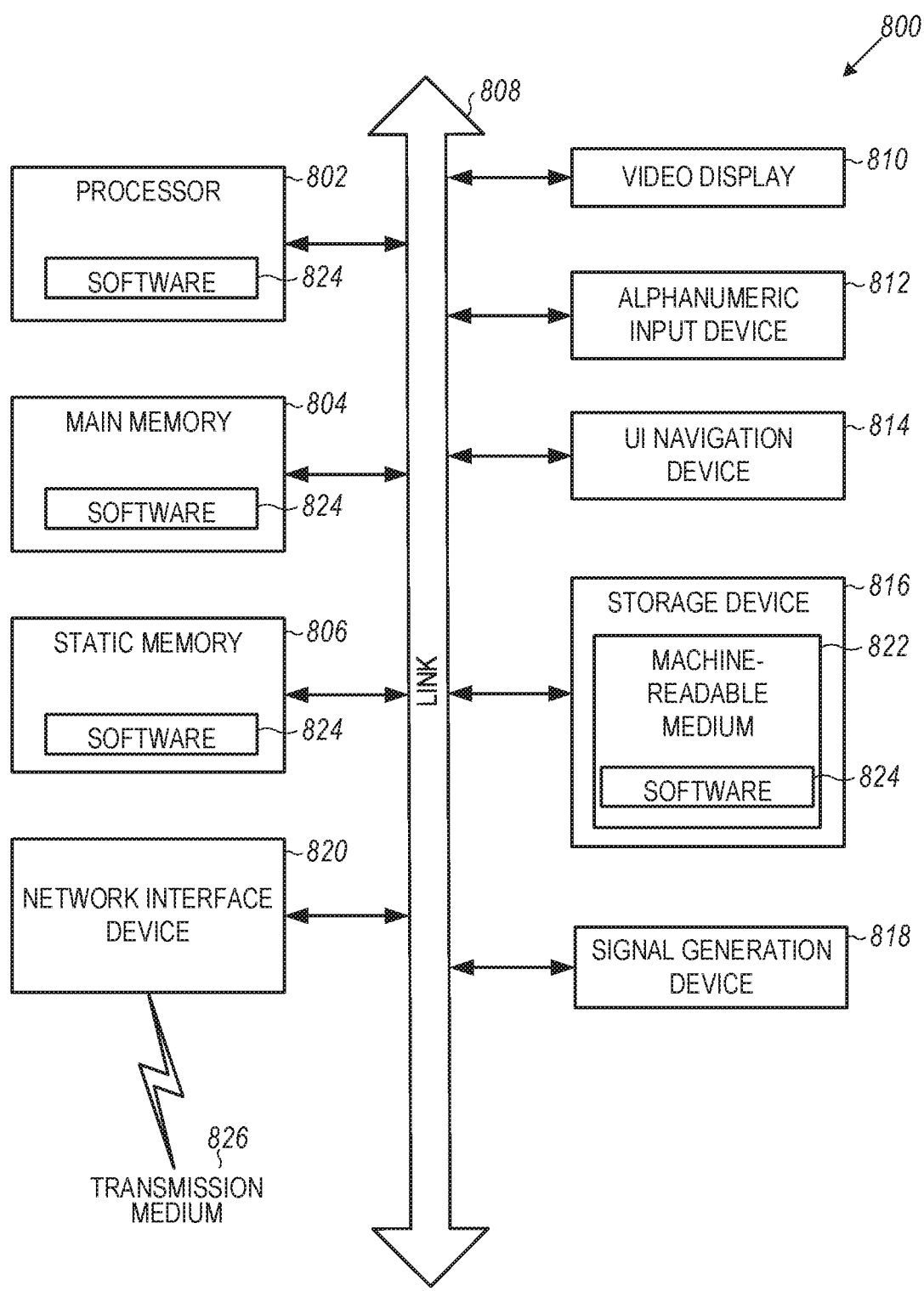
FIG. 8 is an example computing device that can be used in conjunction with the technologies described herein.

FIG. 8 is an example computing device that can be used in conjunction with the technologies described herein. In alternative embodiments, the computing device 800 may operate as a standalone device or may be connected (e.g., networked) to other computing devices. In a networked deployment, the computing device 800 may operate in the capacity of a server communication device, a client communication device, or both in server-client network environments. In an example, the computing device 800 may act as a peer computing device in peer-to-peer (P2P) (or other distributed) network environment. The computing device 800 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 800 may include a hardware processor 802 (e.g., a central processing unit (CPU), a graphics processing unit (GPU), a hardware processor core, or any combination thereof), a main memory 804 and a static memory 806, some or all of which may communicate with each other via a link (e.g., bus) 808. The computing device 800 may further include a display unit 810, an input device 812 (e.g., a keyboard), and a user interface (UI) navigation device 814 (e.g., a mouse). In an example, the display unit 810, input device 812, and UI navigation device 814 may be a touch screen display. In an example, the input device 812 may include a touchscreen, a microphone, a camera (e.g., a panoramic or high-resolution camera), physical keyboard, trackball, or other input devices.

The computing device 800 may additionally include a storage device (e.g., drive unit) 816, a signal generation device 818 (e.g., a speaker, a projection device, or any other type of information output device), a network interface device 820, and one or more sensors 821, such as a global positioning system (GPS) sensor, compass, accelerometer, motion detector, or other sensor. The computing device 800 may include an input/output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 816 may include a computing-readable (or machine-readable) storage media 822, on which is stored one or more sets of data structures or instructions 824 (e.g., software) embodying or utilized by any one or more of the techniques or functions described herein. In an example, at least a portion of the software may include an operating system and/or one or more applications (or apps) implementing one or more of the functionalities described herein. The instructions 824 may also reside, completely or at least partially, within the main memory 804, within the static memory 806, and/or within the hardware processor 802 during execution thereof by the computing device 800. In an example, one or any combination of the hardware processor 802, the main memory 804, the static memory 806, or the storage device 816 may constitute computing device (or machine) readable media.

While the computer-readable storage media 822 is illustrated as a single medium, a "computer-readable storage media" or "machine-readable storage media" may include a single medium or multiple media (e.g., a centralized or distributed database, and/or associated caches and servers) configured to store the one or more instructions 824.

In an example, a computer-readable storage media or machine-readable storage media may include any medium that is capable of storing, encoding, or carrying instructions for execution by the computing device 800 and that cause the computing device 800 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 820 may use the transfer protocols to transmit data using transitory propagating signals.

In an example, the network interface device 820 may include one or more physical jacks (e.g., Ethernet, coaxial, or phone jacks) or one or more antennas to connect to the communications network 826. In an example, the network interface device 820 may include one or more wireless modems, such as a Bluetooth modem, a Wi-Fi modem or one or more modems or transceivers operating under any of the communication standards mentioned herein. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. In an example, a transmission medium may include any intangible medium that is capable of storing, encoding or carrying instructions for execution by the computing device 800, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for supporting custom functions within an application, the method comprising:
   receiving an application add-in comprising a custom function, a custom function source location, and custom function metadata, the custom function metadata including a custom function name;
   registering, within the application, the custom function, wherein registering includes storing the custom function metadata;
   receiving a request to invoke the custom function within a cell of a first document using the custom function name in the cell within the application on a first platform;
   downloading a custom function implementation from the custom function source location;
   executing the custom function implementation a first time;
   receiving a first return value from the custom function implementation;
   automatically executing the custom function implementation a second time;
   receiving a second return value from the custom function implementation from the execution of the custom function the second time; and
   updating the cell of the first document with the second return value.

2. The method of claim 1, further comprising updating the cell the first document based on the first return value after executing the custom function implementation the first time.

3. The method of claim 2, wherein the custom function is a streamed custom function.

4. The method of claim 3, further comprising receiving a state id along with the first return value.

5. The method of claim 4, wherein the state id is passed to the custom function when the custom function is executed the second time.

6. The method of claim 1, further comprising:
   requesting, from the custom function source location, the custom function metadata, the custom function metadata further comprising a custom function parameter list;
   receiving the custom function metadata;
   caching the custom function metadata;
   receiving an input comprising a partial completion of the custom function name;
   determining a match between the partial completion of the custom function name and the custom function name; and
   autocompleting the partial completion to the custom function name.

7. The method of claim 6, wherein the custom function metadata is stored in a roaming profile, and wherein the method further comprises:

receiving a request to invoke the custom function within a first document within the application on a second platform different from the first platform;

downloading the custom function implementation from the custom function source location for the application on the second platform; and executing the custom function implementation.

8. The method of claim 1, further comprising:

receiving a request to invoke the custom function within a second document within the application; and executing the custom function implementation within the second document.

9. The method of claim 1, wherein the custom function implementation is in JavaScript.

10. The method of claim 1, wherein the custom function is a batched custom function, and wherein the method further comprising:

determining the custom function is to be invoked two or more times for a plurality of portions of the first document, wherein the custom function comprises a parameter, and wherein each custom function to be invoked comprises a parameter value;

combining the parameter values based on the custom function being the batched custom function, wherein the combined parameter values are passed to the custom function implementation when executed, and wherein the custom function implementation is executed once.

11. The method of claim 10, wherein the first return value comprises a plurality of return values corresponding to each of the invocations of the custom function, and wherein the method further comprising updating a plurality of portions of the first document based on the plurality of return values.

12. A system for supporting custom functions within an application, the system comprising:

one or more electronic processors configured to:

receive an application add-in comprising a custom function, a custom function source location, and custom function metadata, the custom function metadata including a custom function name;

register, within the application, the custom function, wherein registering includes storing the custom function metadata;

receive a request to invoke the custom function within a cell of a first document using the custom function name in the cell within the application on a first platform;

download a custom function implementation from the custom function source location;

execute the custom function implementation a first time;

receive a first return value from the custom function implementation;

automatically execute the custom function implementation, a second time;

receive a second return value from the custom function implementation from the execution of the custom function the second time; and update the cell of the first document with the second return value.

13. The system of claim 12, wherein the one or more processors are further configured to update the cell the first document based on the first return value after execution of the custom function implementation the first time.

14. The system of claim 13, wherein the custom function is a streamed custom function.

15. The system of claim 14, wherein the one or more processors are further configured to receive a state id along with the first return value.

16. The system of claim 15, wherein the state id is passed to the custom function when the custom function implementation is executed the second time.

17. The system of claim 12, wherein the one or more processors are further configured to:

request, from the custom function source location, the custom function metadata, the custom function metadata further comprising a custom function parameter list;

receive the custom function metadata;

cache the custom function metadata;

receive an input comprising a partial completion of the custom function name;

determine a match between the partial completion of the custom function name and the custom function name; and autocomplete the partial completion to the custom function name.

18. A computer-readable storage media storing computer-executable instructions, which when executed by at least one processor, configure to the at least one processor:

receive an application add-in comprising a custom function, a custom function source location, and custom function metadata, the custom function metadata including a custom function name;

register, within the application, the custom function, wherein registering includes storing the custom function metadata;

receive a request to invoke the custom function within a cell of a first document using the custom function name in the cell within the application on a first platform;

download a custom function implementation from the custom function source location;

execute the custom function implementation a first time;

receive a first return value from the custom function implementation;

automatically execute the custom function implementation, a second time;

receive a second return value from the custom function implementation from the execution of the custom function the second time; and update the cell of the first document with the second return value.

19. The computer-readable storage media of claim 18, wherein the instructions further comprise instructions to update the cell the first document based on the first return value after execution of the custom function implementation the first time.

20. The computer-readable storage media of claim 19, wherein the custom function is a streamed custom function.

* * * * *